(12) United States Patent
Jimenez Mendoza

(10) Patent No.: US 8,734,886 B2
(45) Date of Patent: May 27, 2014

(54) DRIED, POWDERED AVOCADO, MANGO, PRICKLY PEAR AND OATS-BASED FOOD COMPOSITION AND TABLETS

(75) Inventor: Dimas Jimenez Mendoza, Mexico City (MX)

(73) Assignee: Quinasa, S.A. P.I. de C.V., Col. Vallejo (MM)

( * ) Notice: Subject to any disclaimer, the term of this patent is extended or adjusted under 35 U.S.C. 154(b) by 103 days.

(21) Appl. No.: 13/305,718

(22) Filed: Nov. 28, 2011

(65) Prior Publication Data

US 2012/0263861 A1 Oct. 18, 2012

(30) Foreign Application Priority Data

Apr. 15, 2011 (MX) .................... MX/a/2011/004140

(51) Int. Cl.
*A23L 1/10* (2006.01)

(52) U.S. Cl.
USPC ........... 426/615; 426/554; 426/618; 426/631; 426/640; 426/804

(58) Field of Classification Search
USPC .................. 426/615, 618, 631, 554, 640, 804
See application file for complete search history.

(56) References Cited

U.S. PATENT DOCUMENTS

| 2006/0228455 | A1* | 10/2006 | Garza-Lopez et al. | ....... 426/549 |
| 2007/0281059 | A1 | 12/2007 | Smith | |
| 2008/0050498 | A1* | 2/2008 | Sherwood et al. | ............ 426/583 |
| 2009/0007491 | A1 | 1/2009 | Jarolim | |

FOREIGN PATENT DOCUMENTS

| MX | 2007010693 | 3/2009 |
| MX | 278427 | 6/2009 |
| WO | WO2009108035 | 9/2009 |

\* cited by examiner

*Primary Examiner* — Helen F Heggestad
(74) *Attorney, Agent, or Firm* — Matthew J. Lattig; Charter IP, LLC

(57) ABSTRACT

A powdered food composition comprising: (a) 30%-40% powdered dehydrated avocado; (b) 2%-6% powdered dehydrated mango; (c) 2%-6% powdered dehydrated prickly pear (nopal); and (d) 40%-60% oats, the composition having (i) 47%-49% carbohydrate content; (ii) 9%-11% protein content; (iii) 19%-25% monounsaturated vegetal fat (omega −3 y omega −6) content; (iv) 6%-9% raw fiber content; and (v) moisture content between 3%-7%, is disclosed. Also disclosed are a weight loss diet and a school meal diet.

18 Claims, No Drawings

DRIED, POWDERED AVOCADO, MANGO, PRICKLY PEAR AND OATS-BASED FOOD COMPOSITION AND TABLETS

BACKGROUND OF THE INVENTION

1. Field of the Invention

The present invention belongs in the field of food compositions, more particularly, in the field of food composition, to fight obesity and malnutrition.

2. Background of the Invention

Mexico and the United States of America show the largest world percentage of obesity and overweight among 6 to 14 year old children and adults. Such rate of obesity is the result of poor eating habits, mainly for the consumption of what is known as "junk food", which has high caloric contents, standing out among this kind of food, over-consumption of Coca Cola® and other carbonated drinks, indiscriminate consumption of Gansito® and other mass-consumer foods such as, Cheetos®, potato chips, flour cracklings, pop corn and other widely consumed fried food; candy and chocolate; ice-cream and sorbets, hamburgers, pizza and, finally, the consumption of highly fatty products such as tacos, quesadilla, and the like.

Obesity is a public health problem that is invariably related to heart and respiratory conditions, as well as diabetes and hypertension. In addition, obesity is paradoxically related to malnutrition. According to data provided by Public Health Department, treating obesity costs the country 68,000 million pesos, a figure that might soar to 167,000 million in 2017 if poor eating habits persist.

On the other hand, and at the opposite end, malnutrition, which affects children from deprived areas worldwide, has become a major concern for authorities since the absence of a balanced mineral and protein-rich diet prevents children from growing physically and mentally healthily.

Known in the state of the art are different food compositions intended to correct said overweight and malnutrition problems. For example, U.S. Patent Publication No. US-2009-0074919A1 discloses a lunch and breakfast diet: (1) Starter food, a serving consisting of a food combination or a single food, (2) Dairy food, one serving, with or without a flavoring agent, (3) Accompanying food, one or more servings. Any meal serving will be regarded as an accompanying food, if condiment-free. At least three foods must be consumed: A starter, liquid milk and accompanying food. The consumer may select at least two of the three foods, but one has to be a starter. The purpose of said application is to rationalize food servings to reach food balance.

US patent publication No. US-2007-0281059 A1 discloses a carbonated beverage that is prepared by providing a carbonated shelf stable beverage and by adding thereto suitable foodstuff nutrients.

Unfortunately, although the cited prior art has addressed the problem if a balanced diet as a prophylactic measure, these compositions fail to solve the current overweight and malnutrition problem. Treatment of overweight, obesity and malnutrition requires the consumption of natural, nutritious and health foodstuffs and/or preparations making up a healthier diet allowing the reduction of said overweight and obesity.

Table 1 shows the average sizes and weights as recommended for children.

TABLE 1

Chile size and weight

| Age | Light build | | Medium build | | Heavy build | |
|---|---|---|---|---|---|---|
| | Height (cm) | Weight (Kg) | Height (cm) | Weight (Kg) | Height (cm) | Weight (Kg) |
| 5 years | 103.1 | 16.41 | 107.5 | 18.46 | 112.3 | 21 |
| 6 years | 108.8 | 18.09 | 113.5 | 20.67 | 118.6 | 23.58 |
| 7 years | 114 | 19.94 | 119.2 | 23.14 | 124.7 | 26.7 |
| 8 years | 119.3 | 22.1 | 125 | 25.72 | 131 | 30.19 |
| 9 years | 124 | 28.7 | 130.1 | 28.7 | 136.8 | 34.2 |
| 10 years | 128.4 | 26.925 | 135.3 | 31.85 | 142.1 | 38.725 |
| 11 years | 133 | 29.735 | 140.3 | 35.375 | 148 | 43.89 |
| 12 years | 137.4 | 33.05 | 145.8 | 39.775 | 154.1 | 50.215 |
| 13 years | 143 | 36.95 | 152.3 | 45.01 | 161.5 | 57.51 |
| 14 years | 150.3 | 41.95 | 159.6 | 51.1 | 168.4 | 64.28 |
| 15 years | 156.7 | 48 | 165.6 | 58.09 | 174 | 68.7 |
| 16 years | 161.2 | 52.8 | 169.7 | 62.93 | 178.3 | 71.8 |
| 17 years | 163.3 | 54.54 | 172 | 65.115 | 180.4 | 73.85 |
| 18 years | 164.1 | 54.96 | 172.8 | 66 | 181 | 75.03 |

Source: National Research Council, 1989.

The following table shows the medium servings as recommended by age and weight.

TABLE 2

Recommended Nutritional Servings

| Category | Age (years) | Weight (Kg) | Height (cm) | TMB Kcal/day | Mean Kcal serving | | |
|---|---|---|---|---|---|---|---|
| | | | | | TMB-Multiple | By Kg | Per day |
| Children | 1-3 | 13 | 90 | 740 | — | 102 | 1,300 |
| | 4-6 | 20 | 112 | 950 | — | 90 | 1,800 |
| | 7-10 | 28 | 132 | 1,130 | — | 70 | 2,000 |
| Male | 11-14 | 45 | 157 | 1,440 | 1.70 | 55 | 2,500 |
| | 15-18 | 66 | 176 | 1,760 | 1.67 | 45 | 3,000 |
| | 19-24 | 72 | 177 | 1,780 | 1.67 | 40 | 2,900 |
| | 25-50 | 79 | 176 | 1,800 | 1.60 | 37 | 2,900 |
| | 51+ | 77 | 173 | 1,530 | 1.50 | 30 | 2,300 |
| Female | 11-14 | 46 | 157 | 1,310 | 1.67 | 47 | 2,200 |
| | 15-18 | 55 | 163 | 1,370 | 1.60 | 40 | 2,200 |
| | 19-24 | 58 | 164 | 1,350 | 1.60 | 38 | 2,200 |
| | 25-50 | 63 | 163 | 1,380 | 1.55 | 36 | 2,200 |
| | 51+ | 65 | 160 | 1,280 | 1.50 | 30 | 1,900 |

Source: National Research Council, 1989.

As noted, a child has to consume 1,800 to 2,000 Kilocalories, depending on his/her age. A female child has to consume about 2,900 Kilocalories per day, and a female child about 2,200 Kilocalories on a daily basis.

On the other hand, each individual's kilocalorie balance depends on the activity he/she carries out, since the amount of calories required by a 70-kg construction workers differs from that required by an office employee who is sitting 8 hours a day, reason by which the purpose of the present invention is to create a feeling of satiety through dehydrated avocado, prickly pear (nopal) and oats, plus water, which, in addition, may be optimized by way of 20 minutes of physical exercises, such as jogging, walking or working out, and which would entail a consumption of 300 to 1,000 Kilocalories.

TABLE 3

Energy consumption.

| CAL/HOUR ACTIVITY | MALE 80 Kg. | FEMALE 63.5 Kg. |
|---|---|---|
| Sitting, static | 100 | 80 |
| House cleaning | 300 | 120 |
| Office work | 300 | 120 |
| Walking | 460 | 370 |
| Jogging | 730 | 580 |
| Running | 920 | 740 |

Nutritional values for Americans nationals, US Department of Agriculture, 1995.

The food preparation of the present invention is able to provide a high percentage of the necessary daily food requirements that, when supplementing a normal diet, provide the malnourished child with the necessary nutrients allowing him/her to grow normally, and the overweight or obese adult or child with the fat, dietary fiber and carbohydrates that discourage the consumption of foodstuffs that translates into a lower consumption of calories and, consequently, weight loss.

SUMMARY OF THE INVENTION

The primary purpose of the present invention is that of providing a food preparation to reduce obesity and lose weight.

A second purpose of the present invention is to provide a food preparation to fight malnutrition.

Another objective of the present invention is that of providing a powdered, shelf stable food preparation at room temperature and having the organoleptic and nutritional characteristics that are typical in its fresh state.

One other purpose of the present invention is to provide an instant, powdered food preparation that may be easily re-hydrated for consumption.

Even a further objective of the present invention is to provide a food composition in tablets, to be consumed between meals.

Another purpose of the present invention is to provide a food composition that, over time, does not show any enzymatic or non-enzymatic darkening.

One other purpose of the present invention is to provide a food composition that, when consumed, makes the consumer feel filled thus preventing him/her from consume larger amounts of food.

Another purpose of the present invention is to provide a food composition having a natural flavor based on market requirements, such as vanilla extract, or such concentrates as cherry, strawberry, chocolate, mango, hot pepper, chewing gum, tamarind, etc.

The aforementioned objectives are accomplished by providing a long-life shelf stable food composition at room temperature, and having typical organoleptic and nutritional characteristics, comprising: (a) avocado 30%-40%, (b) prickly pear (nopal) 2%-6%; (c) mango 2%-6%, and (d) oats 40%-60%, (i) having a carbohydrate content of 47%-49% carbohydrates, (ii) a content between 9%-11% proteins, (iii) a content between 19%-25% monounsaturated vegetal fat (omega-3 and omega-6), (iv) a content of 6%-9% raw fiber, and (v) a moisture content of about 3%-7%. Therefore, it provides an adequate balance of carbohydrates, proteins, fast, vitamins and minerals as required for proper nutrition.

DETAILED DESCRIPTION OF THE INVENTION

Presently, large sectors of society tend to avoid the consumption of highly processed, synthetic, artificial foodstuffs or those having chemicals elements, favoring the consumption of natural foodstuffs or those with minimum industrial processing. In this sense, goods obtained from such fruits as avocado, mango or leaves of tender prickly pears (nopal) showing identical organoleptic characteristics, and that may be more shelf-stable, are desirable and well valued on the market.

The present invention provides a dehydrated avocado, mango, prickly pear (nopal) and oats-based food composition having a long and shelf-stable life at room temperature that keeps unaltered the organoleptic and nutritional characteristics that are typical of the original components, thus eliminating conservation problems related to fresh fruits and vegetables, such as post-harvest life and enzymatic darkening. The high stability shown allows storage times of at least one year at room temperature, without showing contamination or changes in its color, flavor, aroma and/or nutritional properties.

In addition, the food composition has the following contents:

TABLE 4

Food Composition contents

| Parameter | each 100 g | Standard applied |
|---|---|---|
| carbohydrates | 47%-49% | Proximal Analysis |
| proteins | 9%-11% | NMX-F-608-NORMEX-2002 |
| fat | 19%-25% | NOM-086-SSA1-1994 |
| raw fiber | 6%-9% | NMX-F-613-NORMEX-2003 |
| ash | 2%-3% | NMX-F-607-NORMEX-2002 |
| water | 3%-7% | NOM-116-SSA-1-1994 |
| Energy content | 448 Kcal/g | NOM-051-SSA1SCFI-2010 |

The present invention refers to a food preparation comprising the stable combination of: (a) dehydrated avocado, (b) dehydrated mango, (c) dehydrated fresh prickly pear (nopal), and (d) dehydrated oatmeal.

The mixture of avocado, mango, prickly pear (nopal) and powdered oats of the present invention results in a stable combination of monounsaturated fats, proteins and carbohydrates required to provide child's healthy meals with the necessary balance, whereby a healthy body and a weight adequate to height, age and sex may be accomplished.

The powdered food composition of the present invention is the result of a careful selection of the components and quantities thereof to produce an energy and bromatological content never conceived or accomplished before.

The composition of the present invention pursues to basic ends:

A.—Reduction of overweight and treatment of obesity, especially in children, and B.—The nutritional objective, especially in children.

As will be apparent to a person skilled in the art, although having been conceived to be consumed by children, the composition of the present invention may also applied on adults for same purposes.

The food composition of the present invention has a powdery appearance that may be, (a) formulated as an instant powder to which water must be added (first embodiment of the invention), or (b) formulated to make chewable tablets (second embodiment of the invention).

According to the first embodiment of the present invention, instant powder is disclosed as powder that, when adding water thereto, dissolves the dehydrated components, re-hydrate them, and becomes a beverage.

According to the second embodiment of the present invention, said powder is formulated for making chewable tablets that are consumed during the day.

A.—Overweight Reduction and Obesity Treatment.

Consumption of the food composition of the present invention makes the individual to significantly lose weight. In the first embodiment of the present invention, the food composition of the present invention, when combined with water and be consumed, it re-hydrates and, consequently, expands in the stomach, causing the individual to have a feeling of satiety, so much that the brain sends a signal to the body to indicate that it is filled, thus interrupting the intake of a larger quantity of food, especially foodstuffs having a high content on fat, such as those known as junk food or those having a high content of saturated or monounsaturated stereochemical trans fats.

Each serving provides about 125 calories, as well as 20 g of fat that constitutes 22% of the total amount required on a daily basis (66% of three packages), as well as 10 g of dietary fiber that is 20% of the total quantity required on a daily basis (60% with the consumption of three packages).

Thus, the composition of the present invention provides 66% of the total amount of fat as required on a daily basis, and 60% of dietary fiber, as well as one and a half liter of water. However, the diet was supplemented with the intake of more foodstuffs, of the kind an individual usually consumes, such as soup, tortillas, vegetables, dried fruit, jams and any kind of foodstuff typical of the region where the individual lives in.

In particular, the diet is completed with 150 g of protein of the kind available in the region where the individual lives in. Therefore, in states in northern Mexico, grilled meats or goat; fish or shellfish on the coast; in central Mexico, chicken, beef, fish or pork, and in the southeastern part of the country, beef, fish or chicken, in addition to classic items made with tortilla. Consumption of amaranth, as a source of protein, is also preferred.

Consumption of three 28 g (1 oz.) packages, plus 150 g of protein turns out to be 1,000 kilocalories, approximately, corresponding to 34% of daily requirement (2,900 Kcal) of a 70-kilo person with a 10-kilo overweight. However, this diet makes the individual to feel filled so that he/she no longer wishes to eat more food or fat.

As the quantity of food that would be consumed without consuming the food composition of the present invention drops, so does the consumption of kilocalories in excess in each main meal, allowing a 70-kilogram overweight child (ideal weight=58 kilograms) that would typically consume 3,000 to 3,500 kilocalories, to reduce his/her intake to a maximum of 2,000 Kilocalories a day. The organism, which is used to a high energy consumption then starts to make up for the deficit (1,000-1,500 Kilocalories) using the reserves kept in the organism, causing, therefore, a gradual weight reduction. It has been found that the continuous consumption of the consumption of the composition of the present invention leads to a weight loss of around 2 to 4 kilograms a month.

B.—Nutrition.

The food composition of the present invention provides children from deprived areas, from low-income families or who show some degree of malnutrition, the recommended quantity of the food composition is the equivalent to a 30 g package three times a day, as supplemented with proteins provided by the necessary nutrients for their growth. The contents of each serving, held, for practical purposes, in a package, has 47%-49% carbohydrates, 9%-11% protein, 19%-25% vegetal monounsaturated fat (omega-3 and omega-6), 6% to 9% raw fiber, and 3%-7% water for each serving of instant powder in accordance with the first embodiment of the present invention, which translates into a balanced compound that will allow, together with the individual's usual daily diet, even if scarce, to obtain the necessary nutrients that will allow them to reach an adequate physical and mental growth. Consumption of the composition of the present invention, in addition to the feeling of satiety caused on the individual, will allow his/her mind to eliminate the hunger distracter and be able to better carry out his/her activities, particularly the school ones.

In addition to the feeling of satiety caused by the food composition deriving from re-hydrating the avocado, mango, prickly pear (nopal) fruits and oats, the composition increases in the diet the content of monounsaturated fats that is primary contained in avocado. As a result, the individual consuming the composition of the present invention satisfies his/her daily need of fat so that he/she does not long for more fatty foodstuffs from any other source. The individual does not distinguish between the consumption of monounsaturated fat and saturated or polyunsaturated stereochemical trans fats. However, the organism better processes the monounsaturated fats, whereas the saturated fats are regarded as a risk factor for cardiovascular diseases, and the polyunsaturated trans fats cause atheromatous plaque on arteries.

In accordance with the present invention, the avocado powder-based food composition provides monounsaturated fats, specifically oleic, linoleic and alpha-linoleic oil. Linoleic acid, alpha-linoleic acid, and oleic acid present in said oils are considered as "essential" fatty acids, since said molecules are precursors of omega-3, omega-6 and omega-9 fatty acids, respectively, that are fundamental fats for human physiological functions.

The polyunsaturated trans fats in an obese individual are hard for the body to assimilate; in many cases they do not assimilate however much exercise the individual does and, in many cases, they may only be eliminated through liposuction. By consuming the composition of the present invention, said fats are replaced with new fats built up from omega-3, omega-6 and omega-9 fatty acids.

The consumption of the composition of the present invention, for example, allows to reduce weight from 2 to 4 kilograms a month. Weight loss depends on the degree of obesity of the individual consuming the composition of the present invention. In order to obtain better results, the individual has to supplement his/her meals with a protein-rich diet. Proteins are obtained, for example, eating tuna fish or any other kind of fresh fish or chicken, cooked with very little fat; not fried, and preferably grilled.

Another benefit of consuming one 28 g (1 oz.) package of the food composition of the present invention, together with a protein-rich diet, is that the individual's weight gets stable in a natural and risk-free manner, his/her organic functions normalize, and a general physical welfare is achieved.

When stored, the composition of the present invention does not undergo any color changes and a pleasant appearance is kept. Although the composition may be properly held in any kind of container, storing the composition of the present invention in a transparent and airtight container at room temperature and kept from moisture and direct sunlight is preferred, method that ensures that the properties of the content will remain unaltered for at least one year, and avoids the use of traditional cold storage procedures, toxic antioxidants, and refrigeration chambers for transporting the avocados, mangos, prickly pear (nopal) leaves and oats.

The characteristics of the composition of the present invention make it possible to obtain simpler homogeneous food mixtures when combined with liquid or solid foodstuffs, and without the use of complex industrial processes implying higher energy spending and, consequently, higher costs.

As a result of the conservation characteristics of the composition of the present invention, the quality of the end product and derivatives therefrom remains stable, as do their organoleptic features.

The composition of the present invention also allow for a safe and simultaneous transportation of a larger quantity of grains of the processed composition, without any risk for it to present darkening or microbial contamination. In addition, its long shelf life and long-time integrity of its nutritional properties make its easy to be transported and distributed to any place where it is required.

The product's base includes dehydrated avocado and mango, in addition to prickly pear (nopal) and oats, which allow to obtain a foodstuff made up of 47%-49% carbohydrates, 9%-11% proteins, 19%-25% vegetal monounsaturated fat (omega-3 and omega-6), and 6%-9% raw fiber, and 3%-7% water.

This foodstuff not only provides the necessary kilocalories for proper nourishment, but also contributes to eliminate "junk food" from children's diet and, consequently, from schools.

Components

Below are described some characteristics of the components of the food composition of the present invention.

The composition of the present invention comprises 2%-6% mango, 30%-40% avocado, 2%-6% prickly pear (nopal), and 40%-60% oats, the content on moisture being 3%-7%, approximately, each components being dehydrated separately under adequate dehydration conditions. Once dehydrated, the resulting powders are combined to obtain the formula of the present invention.

Avocado and Mango.

Avocado (*Persea americana*) and mango (*Mangifera indica* L) are some of the most valued fruits worldwide for their multiple benefits when used in the food and cosmetics industries. However, the short shelf time of the whole fruit or of its pulp, are factors that significantly restrict its consumption in areas where these fruits are not produced. In this regard, one of the major problems is the quick degradation of the pulp constituents due to own chemical and enzymatic events, which are quickly triggered when exposed to the environment. These phenomena, known as enzymatic or non-enzymatic darkening, are the main reason for the swift degradation of the avocado and mango fruits and of their pulps, and of the pulp of other fruits, including tropical ones, that are highly consumed, even in those food compositions they become a part of. Due to these phenomena, avocado and mango are preferably consumed fresh and in a short time, which may only be feasible in areas where they are produced.

To obtain the composition of the present invention, a process that allows efficient dehydration—separately—of fresh avocado, mango and prickly pear (nopal), is performed. For purposes of the present invention, efficient dehydration means the process that allows to eliminate the water contained in the pulp of the fresh avocado and mango fruits and in the prickly pear (nopal) leaves by dehydration until leaving the minimum quantity of moisture as required to prevent growth of microorganisms. This process eliminates the use of complex procedures or devices that may lead to significant losses in the resulting obtaining of dehydrated pulp or time input to obtain powdered pulp of avocado, mango and of prickly pear (nopal) leaves.

There are several methods to dehydrate avocado and produce avocado powder, however, the avocado dehydration process disclosed in Mexican Patent No. 278,427 & WO-2009/108035, by the same inventor of the present application is preferred, and whose full description is incorporated into the present application for referential purposes.

The characteristics of the powder depend, to a great extent, on the kind of avocado used. A preferred example is the Hass variety, which, once dehydrated and powdered, has the properties that are indicated in the following table.

TABLE 5

| Bromatological analysis of avocado | |
|---|---|
| Avocado | each 100 g |
| Calories | 612 Cal |
| Fatty calories | 447 Cal |
| Fat | 49.66 g |
| Proteins | 6.73 g |
| Moisture | 2.62 g |
| Ash | 6.44 g |
| Total carbohydrates | 34.55 g |
| Dietary fiber | 17.3 g |
| Sugars | 2.4 g |
| Cholesterol | 0 mg |
| Saturated fat | 20% fat |
| Monounsaturated fat | 68% fat |
| Polyunsaturated fat | 11% fat |
| Trans fat | 1% fat |
| Sodium | 1,300 mg |
| Iron | 2.48 mg |
| Vitamin A | 133 I.U. |
| Vitamin C | 18.0 mg |
| Calcium | 40 mg |

The avocado used for the composition of the present invention has a moisture content of 0.9%-6%, particle size being 50 to 250 μm, and aqueous activity of 0.25 to 0.6

Among other components, avocado mainly provides the monounsaturated fat of the composition of the present invention.

On its part, mango has a high content of vitamin A, which confers it an antioxidant property. In addition, mango has a high content of vitamin A and malic, p-coumaric, palmitic and myristic acids. Finally, mango is rich in dietary fiber and flavonoids, which confers it an anti-carcinogenic function.

The preferred avocado dehydration process is disclosed in Mexican patent application No. MX/a/2007/10693, by the same inventor of the present application, which is fully incorporated hereinto for referential purposes. The outcome is mango having a 94.4 to 99.1 degree of dehydration (total moisture content of 1%-5% by weight), the particle size being 50 to 250 μm, and aqueous activity of 0.25 to 0.6

An example of dehydrated avocado has the following characteristics:

TABLE 6

Mango analysis

| Mango | each 100 g |
|---|---|
| Moisture | 4.53% |
| Color | Intense yellow |
| Aqueous activity | 0.25-06 |
| Total carbohydrates | 48.74% |
| Proteins | 2.76% |

The fiber of the composition of the present invention is mainly provided by the mango.

Prickly Pear (Nopal).

The healing properties of plants, especially from the cactus family, have been used for thousands of years, and the beneficial food, medical and nutritional properties of prickly pear (nopal) have presently substantiated by scientific research, and the use of this fruit is widely recommended by nutritionists.

As for prickly pear (nopal) leaves or stalks, said properties increase when tender, which corresponds to stalk shoots (cladodes) of the prickly pear (nopal) plant.

As for prickly pear's (nopal's) nutritional value, two cups of raw prickly pear (nopal) (86 g, approximately) contains around 2.9 g of carbohydrates, 1.1 g of protein, and an energy content of only 14 Kcal. But its main appeal is that it contains a large quantity of dietary fiber (soluble and insoluble): 2 g of fiber per cup. Insoluble fiber strengthens intestinal activity, helping to keep the digestive system healthy. Soluble fiber, according to recent research on nutrition, helps to lower cholesterol. There is a 30:70 soluble-insoluble fiber ratio. Insoluble fiber can prevent and alleviate constipation and hemorrhoids, and, at the same time, prevents the onset of colon cancer. Soluble fiber has been used on many ailments because its presence in the digestive tract retards the absorption of nutrients and prevents them from quickly passing to the blood. It is also a good source of calcium, since 100 g of prickly pear (nopal) contains around 80 mg of calcium.

As for prickly pear (nopal), this is prepared by using any conventional dehydration technique, for example, hot drying, lyophilization or spraying. The dehydrated prickly pear (nopal) is crunched into a size below 1 mm in diameter. The product's moisture content must be from 4% to 6%, and an aqueous activity between 0.40 y 0.55, which may be prepared in accordance with any technique available.

The dietary fiber of the composition of the present invention is also provided by prickly pear (nopal).

Oats.

On the other hand, the nutritional value of cereals is widely acknowledged, since they have been cultivated for centuries worldwide and have always been the food basis of different peoples and culture around the world.

Cereals are the seeds of such grass plants as wheat, oats, barley, rye, rice, corn, millet, etc. All those that keep their bark are known as whole wheat, which have high contents of minerals, vitamins and vegetal fiber.

Oats is particularly known for its high nutritional value for its protein and fiber contents and the presence of some vitamins and minerals. Oats is the cereal having the largest content of protein and essential amino acid. Oats grain often exceeds Food Agricultural Organization (FAO) requirements on protein and essential amino acid content. Another major characteristic of oats is that is has insoluble fiber and soluble fiber, in addition to the fact that there is no other cereal containing a larger quantity of soluble fiber than oats. As for vitamins, oats is particularly rich in vitamin E and group B vitamins, especially B1, which is often referred to as the "nerve" vitamin, indispensable for the brain and nervous system areas that control learning and concentration. As regards minerals, oats has more calcium, iron, phosphorous, magnesium, copper and zinc that any other cereal grain. Calcium is vital for the formation of strong bones and teeth, and iron is an important element for blood. In addition, all the aforementioned minerals play relevant roles in the metabolic process, reason by which it is widely accepted by society.

According to the present invention, oats may be used in the form of flakes or, preferably, crushed into particles smaller than 1 mm and dehydrated through any well-known method, until 5% to 9% moisture content, and 0.45 to 0.57 aqueous activity.

Drying may be carried out by a hot-drying or a rotary drum drying process. The rotary drum drying method consists in introducing some bulk material into a generally cylindrical tank or drum that rotates while the material moves within the tank while the tank spins.

The components used in the present invention are crushed separately in a conventional mill under conditions that allow to obtain a desired particle size. Then, the crushed material is screened with a grain classifier having a screen of such a size that lets the mentioned particle go through, such as, for example, a 60 to 115 screen. At this stage of the process, the particles that have been retained by the classifier are returned to the crushing process in order for the particles to get the adequate size.

Flavoring Agent.

A flavoring agent may be optionally added to the composition of the present invention, flavoring agent that may artificial or natural. However, due to the nature of the components used and the processes performed, where no chemical agents are added, the use of a natural flavoring agent is preferred. The natural flavoring agent may be added in a liquid or powder state, selected from the vanilla, mango, cherry, strawberry, hot pepper, chewing gum, tamarind, mamey, banana, raspberry, coco, prickly pear (nopal), mandarin, orange, pecan nut, pineapple, blackberry, kiwi, guava, plum, raisin, chocolate extract or concentrate groups, and, in general, any kind of natural flavoring agent.

The formulation of the composition of the present invention comprises the following steps:

a) providing individual flows of mango, avocado and oats pulp, and of dehydrated and crushed prickly pear (nopal);
b) optionally, providing a flavoring agent, preferably a natural flavoring agent;
c) mixing the dehydrated avocado, mango, prickly pear (nopal) and oats powders, as well as the optional natural flavoring agent until homogenized;
d) packing the dehydrated and crushed product.

Once completed the obtaining process, the food composition of the present invention is moved and poured into weight bins in a packaging system to be later packed in containers by using a conventional packaging machine. In practice, any kind of clean and dry container may be used to conserve the food composition of the present invention. However, containers that are easy access handle and transport and having a recognized commercial value are preferred. Examples of said containers are plastic or polyethylene terephthalate (PET) bottles, crystal or glass jars, inner-coated cardboard boxes or laminated bags having a polyethylene layer in contact with the foodstuff and an outer polyester layer to be printed, or packages or aluminized bags of any weight (grams), for example, 10 Kg, 4 or 24 Kg, 1 Kg (940 g), 500 g (480 g), or 28 g (1 ounce).

First Embodiment of the Invention

According to the first modality of the present invention, a 28 g (1 ounce) instant powdered package is provided as a base food to fight obesity or nourish individuals, especially children.

A g (1 ounce) package of the food composition contains 19%-25% fats, 9%-11% proteins, 47%-49% carbohydrates, and 6%-9% raw fiber, constituting a balanced food composition. In addition to a 3%-6% moisture content, a 28 g (1 ounce) serving of the food composition has an energy content of about 125 Kcal.

With the food composition of the present invention, 6-14 year-old children nourish and stop eating candy and French fries, and cease to drink beverages. The 28-gram package in dissolved in water and then consumed. As a result, the child satiates his/her appetite and does not eat any food for a 6-hour period.

Consumption depends on the child's overweight level. Daily consumption may be one to three 28 g packages of the composition of the present invention. As regards daily consumption of 3 38 g servings, the preparation implies the consumption of 1,500 milliliters of water. Water has various effects: it rehydrates the components of the food composition; when consumed, it occupies a significant portion of the stomach's total volume, and, finally, as is well known, it benefits the individual's physiology.

Second Embodiment of the Invention

The second embodiment of the present invention comprises chewable tablets, using the dehydrated and powdered composition of the present invention.

A preferred composition for the chewable tables comprises (a) 30%-40% powdered avocado, 40%-60% oats, 2%-6% mango, and 2%-6% prickly pear (nopal), the moisture content being between 3% and 7%. In addition, it includes about 2.5% of a compacting agent and an excipient. Several known compounds may be used as compacting agents, for example, magnesium estearate, starch or glucose, among others.

The chewable tablets may take any shape and size. Circular 10 mm diameter and 2 mm wide tablets are preferred. Each tablet weighs 1.2-1.6 g.

Consumption of the chewable tablets of the present invention is preferably related to the consumption of at least 500 ml of water. The tablets expand inside the stomach, thus increasing the volume of the components upon dehydration, causing, accordingly, the feeling of satiety consequently and discouraging food the intake for a period of up to six hours.

The proper serving depends on the level of overweight or malnutrition. However, the adequate daily serving would vary from 24 to 96 chewable tablets a day, equivalent to 1 to 4 28 g (1 ounce)-instant powdered servings. Daily consumption of at least 2 chewable tablets, resulting in the daily consumption of 8 tablets prior to each meal, equivalent to about 125 Kcal, is recommended.

Third Embodiment of the Invention

In a third embodiment of the present invention, the composition of the present invention comprises (a) 30%-40% powdered avocado, (b) 40%-60% oats, (c) 2%-6% mango, and (d) 2%-6% prickly pear (nopal), with a moisture content between 3% and 7%, mixed with chocolate, in a 70% food composition and 30% chocolate preparation.

The third embodiment preferably comprises chocolate with a total weight of 9 to 28 g (1 ounce), preferably between 9 and 15 g. The preferred amount of chocolate is 15 g.

The proper serving depends on the level of overweight or malnutrition. However, the adequate serving would vary from 3 to 12 chocolates a day, equivalent to 1 to 4 28 g (1 ounce)-instant powdered servings a day. A daily consumption of three 15 g chocolates, having an effect similar to that of a daily 30 g serving is recommended.

The addition of 30% chocolate increases the protein and fat content, a fact that must be taken into account when designing a diet.

As in the case of the chewable tablets and instant powder, consumption of chocolate in accordance with the present invention, must be accompanied by the intake of at least 750 ml of water.

The following examples are used to illustrate the present invention, without limiting its scope.

EXAMPLE 1

Preparation of the Food Composition of the Present Invention

Obtaining 100 kilograms of the food preparation of the present invention required the mixing of:

35 Kg of dehydrated Hass avocado powder (35%)

4 Kg of dehydrated Ataulfo mango powder (4%)

4 Kg of dehydrated prickly pear (nopal) powder (4%)

57 Kg dehydrated oats powder (57%).

As for the mango and avocado, the particle size of the dehydrated powders spans from 125 to 250 μm, said powders being sifted and passing through a grain classifier having a 60 to 115 screen size. As for the oats and prickly pear (nopal), these components are crunched into a particle size of 1 mm.

The dehydrated mango, prickly pear (nopal), oats and avocado powders were mixed together to prepare the composition of the present invention.

Once concluded the obtaining process, the food composition of the present invention is transferred and poured into weight bins of a packaging system, to be later transferred to packages by using a conventional packing machine.

EXAMPLE 2

First Embodiment of the Composition of the Present Invention

Instant Powder

The composition was prepared according to Example 1 and comprises:

35 Kg of dehydrated Hass avocado powder

4% dehydrated Ataulfo mango powder

4% of dehydrated prickly pear (nopal) powder

57% of crushed oats, and 2.5% liquid vanilla extract as a natural flavoring agent for its homogenization was added. The composition has the following characteristics:

a) 25% fat content, b) 9% proteins, c) 49% carbohydrates, and d) 10% raw fiber, that make up the food composition.

EXAMPLE 3

Second Embodiment of the Composition of the Present Invention

Chewable Tablets

The food composition of Example 1 was compacted into 1.2 g chewable tablets by using 0.2% magnesium estearate as a compacting agent.

EXAMPLE 4

Weight Loss Diet

The effect of the consumption of three servings or 28 g packages on overweight children was analyzed. One package before each meal was consumed. Each package was hydrated with 500 ml of water.

The composition of the present invention was used on 100 overweight children, divided into daily 28 g servings per child (one package), for 30 days, in which period 95% of the children were able to lose 2 to 4 kilograms, and the remainder 5% of the population 1 kilogram. Such results are regarded as significant when considering that these morbid obesity cases require medical check-ups and controlled exercises, since most cases obesity is of a hormonal nature.

The following table summarizes these results. In this table, build refers to the build classification contained in Table 1, child weights and heights.

| No. | Age (Years) | Initial Weight (Kg) | Build | Final Weight (Kg) | Build | Weight Loss (Kg) | Weight Loss % |
|---|---|---|---|---|---|---|---|
| 1 | 7 | 25 | Heavy | 23 | Medium | 2 | 8.0 |
| 2 | 9 | 30 | Heavy | 28 | Heavy | 2 | 6.6 |
| 3 | 10 | 38 | Heavy | 33 | Heavy | 5 | 13.2 |
| 4 | 10 | 39 | Overweight | 37 | Heavy | 2 | 5.1 |
| 5 | 10 | 42 | Overweight | 36 | Heavy | 6 | 14.3 |
| 6 | 11 | 43 | Heavy | 40 | Heavy | 3 | 7.0 |
| 7 | 12 | 45 | Heavy | 40 | Medium | 5 | 11.1 |
| 8 | 12 | 46 | Heavy | 41 | Heavy | 5 | 10.9 |
| 9 | 12 | 46 | Heavy | 42 | Heavy | 4 | 8.7 |
| 10 | 12 | 47 | Heavy | 42 | Heavy | 5 | 10.6 |
| 11 | 12 | 47 | Heavy | 44 | Heavy | 3 | 6.4 |
| 12 | 12 | 48 | Heavy | 46 | Heavy | 2 | 4.1 |
| 13 | 12 | 48 | Heavy | 46 | Heavy | 2 | 4.1 |
| 14 | 12 | 50 | Overweight | 46 | Heavy | 4 | 8.0 |
| 15 | 12 | 52 | Overweight | 48 | Heavy | 4 | 7.6 |
| 16 | 13 | 53 | Heavy | 49 | Heavy | 4 | 7.5 |
| 17 | 13 | 55 | Heavy | 51.3 | Heavy | 3.7 | 6.7 |
| 18 | 13 | 57 | Overweight | 55 | Heavy | 2 | 3.5 |
| 19 | 13 | 60 | Overweight | 57 | Heavy | 3 | 5.0 |
| 20 | 14 | 62 | Heavy | 58 | Heavy | 4 | 6.5 |
| 21 | 14 | 64 | Overweight | 60 | Heavy | 4 | 6.3 |

In addition, the specification includes any combination or sub-combination of elements of the different kinds and/or embodiments of the present invention. A person skilled in the art will recognize that these characteristics and, therefore, the scope of this disclosure, shall be interpreted in light of the following claims and any other equivalents thereto.

What is claimed is:

1. A powdered food composition, comprising:
   30% - 40% powdered dehydrated avocado;
   2% - 6% powdered dehydrated mango;
   2% - 6% powdered dehydrated prickly pear; and
   40% - 60% oats.

2. The food composition according to claim 1, wherein said powdered dehydrated avocado further having:
   a particle size between 50 and 250 µm; and
   an aqueous activity of 0.26 to 0.60.

3. The food composition according to claim 1, wherein said oats further having:
   a particle size below 1 mm;
   a moisture content ranging from 5% to 9%; and
   an aqueous activity of between 0.45 and 0.57.

4. The food composition according to claim 1, wherein said powdered dehydrated prickly pear further having:
   a particle size of 1 mm; and
   an aqueous activity of between 0.40 and 0.55.

5. The food composition according to claim 1, wherein said powdered dehydrated mango further having:
   a particle size is 50 to 250 µm; and
   an aqueous activity of 0.25 to 0.60.

6. The food composition according to claim 1 further comprising 0.250% flavoring agent.

7. The food composition according to claim 1 further comprising 0.2% of magnesium stearate or starch or glucose.

8. The food composition of claim 1 further comprising chocolate, at a ratio of chocolate to claim 1 composition of 25:75 to 40:60.

9. The food composition according to claim 8 further comprising 0.250% flavoring agent.

10. The food composition according to claim 8 further comprising 0.2% of magnesium stearate or starch or glucose.

11. The food composition according to claim 8, further comprising 10 g of the food composition of claims 1 and 5 g of chocolate.

12. The food composition according to claim 8, wherein said powdered dehydrated avocado further having:
    a particle size between 50 and 250 µm; and
    an aqueous activity of 0.26 to 0.60.

13. The food composition according to claim 8, wherein said oats further having:
    a particle size below 1 mm;
    a moisture content ranging from 5% to 9%; and
    an aqueous activity of between 0.45 and 0.57.

14. The food composition according to claim 8, wherein said powdered dehydrated prickly pear further having:
    a particle size of 1 mm; and
    an aqueous activity of between 0.40 and 0.55.

15. The food composition according to claim 8, wherein said powdered dehydrated mango further having:
    a particle size is 50 to 250 µm; and
    an aqueous activity of 0.25 to 0.60.

16. A powdered instant food comprising 28 g package of the food composition of claim 1.

17. A food tablet comprising 1.2 to 1.6 grams of a food composition according to claim 1.

18. A diet food comprising:
a) a serving of at least one food composition selected from any one of the following:
   i. 3 to 12 15 g of food composition of claim 8,
   ii. 1 to 4 28 g packages of powdered instant food of claim 16, and
   iii. 24 to 96 1.2 g tablets of claim 17;
b) 150 g of protein selected from fish or chicken; and
c) at least 750 milliliters of water.

* * * * *